United States Patent [19]
Dean, Jr.

[11] 3,913,832
[45] Oct. 21, 1975

[54] ASPIRATING THERMOSTAT

[75] Inventor: Frank J. Dean, Jr., Kansas City, Mo.

[73] Assignee: Tempmaster Corporation, Kansas City, Mo.

[22] Filed: Mar. 8, 1974

[21] Appl. No.: 449,373

Related U.S. Application Data

[63] Continuation-in-part of Ser. No. 327,011, Jan. 26, 1973, Pat. No. 3,817,452.

[52] U.S. Cl. .................................... 236/49; 236/87
[51] Int. Cl.² ................. F24F 11/04; G05D 23/08
[58] Field of Search ....................... 236/49, 80, 87

[56] References Cited
UNITED STATES PATENTS

| | | | |
|---|---|---|---|
| 2,259,061 | 10/1941 | Caffier | 236/49 X |
| 3,232,112 | 2/1966 | Wehlau | 73/349 |
| 3,434,409 | 3/1969 | Fragnito | 236/80 X |
| 3,559,884 | 2/1971 | Visos et al. | 236/80 F |
| 3,743,180 | 7/1973 | Perkins et al. | 236/49 X |
| 3,790,075 | 2/1974 | Rifin et al. | 236/49 |
| 3,837,571 | 9/1974 | Waeldner et al. | 236/80 X |

*Primary Examiner*—William E. Wayner
*Attorney, Agent, or Firm*—Lowe, Kokjer, Kircher

[57] ABSTRACT

An aspirating thermostat for use in an air duct system with an inflatable bladder or other similar type of device for controlling damper position in an air duct system has a unique tubing interconnection with the bladder and with the thermostat. The orifice and nozzle effect created by the T connection operate in conjunction with a thermostatically adjustable bleed port to deflate (and inflate) the bladder under preselected temperature conditions thereby insuring proper damper position and air volume distribution in the duct system.

An adjustable portion of the thermostat is accessible from the exterior of the ceiling in a normal installation so that fingertip control of both the unique bleed port (controlling air volume) and the temperature adjusting lever may be accomplished.

4 Claims, 3 Drawing Figures

ASPIRATING THERMOSTAT

BACKGROUND AND BRIEF DESCRIPTION OF THE INVENTION

This is a continuation-in-part of my application entitled DUCT PRESSURE ACTUATED VARIABLE VOLUME DEVICE which was filed Jan. 26, 1973, and which bears Ser. No. 327,011, now U.S. Pat. No. 3,817,452.

The invention relates to improvements both in the inventions disclosed primarily in FIGS. 3 and 5 in the above-mentioned patent application. For example, it was disclosed with reference to FIG. 5 that controls were available for automatically adjusting and controlling the pressure within the inflatable bladder. The FIGURE illustrated a right angled T connection identified by the numeral 48 and that it was interposed in the conduit 36 to force a sharp turn in the air flow in and out of the bladder 34. There was further disclosed a manually adjustable flow restrictor and a thermostatically adjustable bleed port 58 which were in the downstream section 52 of the pneumatic control system. The restrictor 56 dictated the maximum rate of exhaust flow to the open end 54 while the bleed port 58 acted as a small orifice open to the ambient air and permitting the escape of a certain minimum rate of exhaust flow from the damper bladder bleed line 52 at all times. The thermostatically adjustable bleed port (element 58 in FIG. 5 of the copending application) corresponds to a combination of the bore 68 in FIG. 3 and the thermostatically operated bimetal strip 76, likewise shown therein.

The subject invention relates to an improved inducing T that operates in combination with the inflatable bladder and the aspirating thermostat to insure that a sufficient amount of air can bleed out through the thermostat, thereby deflating the bladder under proper conditions and insuring that the damper responds to the different demands for air volume under these circumstances. The inducing T is uniquely shaped and will cooperate with the thermostatically controlled bleed port so as to induce air from the bladder in correlation with a manually determination of the opening size and will effect the proper deflation (or inflation) of the inflatable bladder.

Other unique portions of the subject invention include the utilization of a spiral bimetallic element in combination with a geared bracket positioner controllable by a temperature adjusting lever and an exteriorly accessible volume adjusting knob for the aspirating thermostat. This invention will permit air to be taken from the room and discharged directly thereto so that air pressure changes either in the discharge plenum or into the space above the ceiling will not adversely affect the functioning of the aspirating thermostat. The unique construction of the thermostat creates a continuous flow of room air over the bimetal to accurately sense room air temperature. At the same time, the air utilized for sensing purposes is discharged into the air flow out from the associated air diffuser eliminating any unwanted pressure differentials or drafts.

An object of the invention is to provide a uniquely constructed inducing T for utilization with an inflatable bladder for positioning an air volume control damper in associated duct supply systems.

Another object of the invention is to provide a uniquely constructed aspirating thermostat having a thermostatically adjustable bleed port that is easily accessible from the interior of a room being temperature conditioned.

A further object of the invention is to provide an aspirating thermostat of the character described which includes a uniquely constructed temperature adjusting lever which will include a geared bimetal bracket that permits a relatively large movement of the adjusting lever to effect a small movement of the spiral bimetal. This feature in conjunction with the thermostatically adjustable bleed port gives a user more accurate control over temperature setting which could require element positional changes of only .01 of an inch or less. Since such fractional portions of an inch are impossible to manually distinguish, more accurate settings are now possible.

A still further object of the invention is to provide in a duct pressure actuated variable volume system, a uniquely constructed inducing T for utilization with an inflatable damper positioning device. This device includes an easily accessible volume limit or adjustable knob and temperature adjustable lever as a portion of the aspirating thermostat with the above elements cooperating to control the damper position.

It is an important object of the invention to provide a means by which the inflatable bladder utilized with the system described is deflated at the proper times regardless of pressure buildups throughout the system. The subject deflating means includes the novel inducing T which acts as a small ejector to aid in the removal of air from the bladder when the thermostat calls for more cooling. In this manner, the room temperature setting can be adjusted by moving the thermostat adjusting lever to any desired comfort setting and the inducing T will insure proper damper positioning.

A still further object is to provide in an aspirating thermostat, a uniquely arranged adjustable air volume restrictor easily accessible with respect to said thermostat and operable to limit the maximum quantity of conditioned air into the room regardless of a buildup of pressure which could occur in the main conditioned air supply as a result of the thermostat setting.

These and other objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views.

Figure 1:
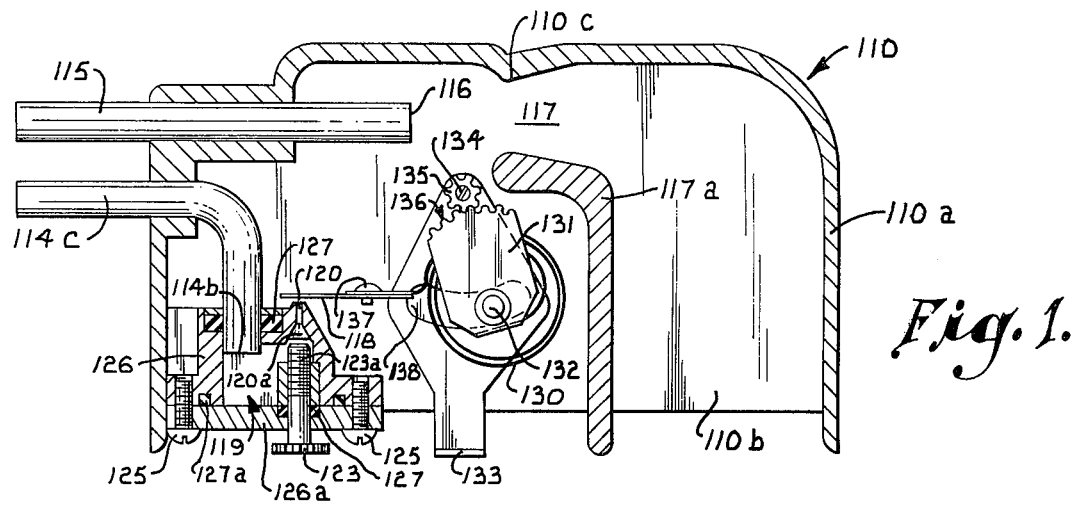
FIG. 1 is a cross sectional view showing the operating elements that comprise the integral aspirating thermostat which will normally be mounted in the diffuser slot with the air volume adjustment knob and the temperature adjustment lever accessible from within the room associated with the diffuser.
Figure 2:
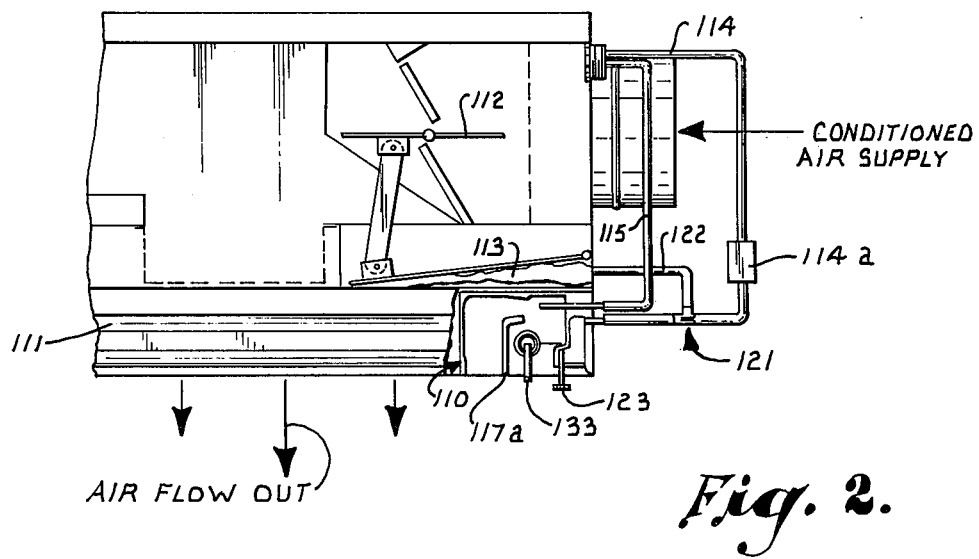
FIG. 2 is a partial schematic view of the diffuser, main air flow duct, inflatable bladder, positional damper, aspirating thermostat, and inducing T associated with the duct pressure powered controls as disclosed in my copending application.

Turning now more particularly to the drawings, FIG. 1 shows the aspirating thermostat 110 which, in cooperation with the duct system shown in FIG. 2, will vary and limit the maximum volume of air being distributed through the slot type air diffuser 111. The features of the damper 112, bladder 113 and their operation in conjunction with the pressure differential sensing tubes 114 and 115 is fully described in my copending application mentioned above. However, the added unique features of the subject aspirating thermostat may be seen by a consideration of the overall operation of the duct pressure actuated system.

On start up, bladder 113 is deflated and damper 112 is fully open. The supply air from the main duct enters the terminal unit and is diffused in accordance with the physical configuration of the air diffuser 111. The supply air flows through the tube 115 to an aspirating jet 116 that is located interiorly of the thermostat 110. Air discharged from the jet 116 travels through the narrow ejector passage 117 which is formed by the interior wall 117a along with the upper and right hand (as viewed in FIG. 1) interior surface of the thermostat casing hereinafter referred to by the numeral 110a, to thereby create a high velocity, low pressure condition interiorly of thermostat 110. This low pressure condition induces air upward from the room across the bimetal strip 130 and back through the ejector passage 117 of the thermostat thereby discharging same into the room. This creates a continuous flow of air over the bimetal and permits the actual room air temperature to be accurately sensed.

The supply air also flows through the tube 114 to the filter 114a and into the lower chamber of the thermostat which will be generally designated by the numeral 119 (see FIG. 1) and which will be described in more detail later. In any event, the air flowing into chamber 119 through the tube 114 exits from the tube end 114b. If the thermostat is in a position calling for more cooling, the bimetal 130 will expand and the air from the chamber 119 will bleed out through the thermostatically controlled bleed port 120 that is located beneath the outer end of the bimetal connected valve arm 118. Under these conditions, damper 112 remains open and the full flow of conditioned cool air passes through the unit diffuser and into the room.

As the temperature decreases satisfying the thermostat requirement, bimetal 130 contracts and begins to close the port 120 via the valve arm 118. This forces air from the filter to pass through the inducing T 121 (described in more detail, infra) and into the bladder. As the bladder fills, the damper is moved to a position which allows only enough conditioned air through the diffuser to maintain the desired temperature within the room. The damper movement has been fully described in my copending application mentioned above.

Figure 3:
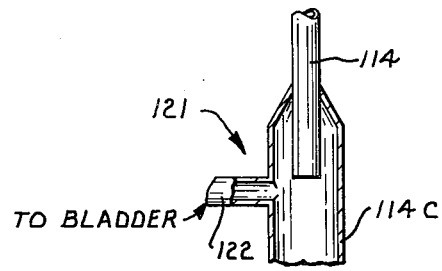
FIG. 3 is an enlarged partial sectional view of the inducing T.

It is important to note that the inducing T 121 (shown in enlarged section in FIG. 3) acts as a small ejector to aid in the removal of air from bladder 113 when the thermostat calls for more cooling. This feature will likewise be discussed in more detail, however it should be noted that the FIG. 3 view of the inducing T 121 is comprised of the tube 114 entering into a larger diameter tube hereinafter identified by the numeral 114c and which terminates in end 114b interiorly of chamber 119. The upper portion of the larger diameter tube 114c (FIG. 3) maintains a tight fit over the diameter of the smaller tube 114 and cooperates with same to create a nozzle effect in and around the tube 122 which leads to the bladder 113. The concentrically interfitting of the tubes 114 and 114c of substantially differing diameters will create a pressure differential between the pressure interiorly of an inflated or partially inflated bladder 113 and the pressure within the tube 114c that is directing air to the chamber 119 when more cooling is called for. Accordingly, when the inflatable bladder 113 is to be deflated (as would be the case when more cooling is demanded and the air flow into the terminal unit and through the diffuser is to be increased) the T, in combination with the bleed port 120, will serve to insure that inadvertent pressure buildups will not preclude the proper deflation of the damper actuating bladder.

The volume knob and mechanism 123 is used to limit the maximum quantity of conditioned air flow through the diffuser and into the room regardless of the pressure buildup which may occur in the main conditioned air supply duct. As will be seen, this mechanism (123) (including the threaded shaft 123a associated with same) cooperates with the bleed port 120 for a positive control over the bladder condition. It should be pointed out that the volume adjustment mechanism 123 is located in the diffuser slot with the knob being slightly exterior thereof and is easily accessible from the room for adjustment purposes. Of course, remote mounting of the thermostat is possible with only slight modifications of the related system.

Turning more particularly to a detailed description of the aspirating thermostat, the thermostat 110 has a casing 110a which may be constructed of any suitable material including plastic, the casing will have appropriate apertures therein on the left side thereof (FIG. 1) to facilitate the insertion of the tubes 115 (the aspirating air supply) and 114c (the damper bladder bleed line). The ejector passage that was identified by the numeral 117 is formed by a substantially right angle interior wall 117a that spans the distance between the two side walls 110b of the thermostat casing 110a. This wall (117a) will cooperate with the inner surface of the thermostat casing to form a nozzle outlet. For example, the upper portion of the inner wall 117a which lies in a slightly diverging, but generally horizontal plane cooperates with an indentation (identified by the numeral 110c) in casing 110a. Indentation 110c and the upper end portion of the wall 117a form the throat of a nozzle like structure with the indentation flaring outwardly and upwardly and cooperating with the downwardly diverging, generally horizontal, portion of wall 117a to essentially create the initial portion of the ejector passage 117. The vertical portion of the wall 117a and the right and inner surface of the casing 110a are then in communicating relationship at the lower end thereof with the room and will permit air to be ejected therefrom.

As further seen in FIG. 1, the space to the left of the inner wall 117a is occupied by the geared bimetal bracket and spiral or helical bimetal spring along with the chamber structure. There will be, however, a sufficient space between the chamber housing structure and the left hand (as viewed in FIG. 1) portion of wall 117a to permit air to flow from the room across the bimetal into the jet from the aspirating air supply (116) and into ejector passage 117.

The chamber 119 located within block 126 may be constructed of the same type material (a rugged thermoplastic) and will be attached (by an adhesive, welded, or by any other suitable means) interiorly of the thermostat casing 110a adjacent the lower left corner thereof (FIG. 1). The block 126 is comprised of a hollow interior forming the chamber 119 with the outer plate 126a being attached to the lower edge surface of same by the screws 125. O-ring sealers 127 circumscribe the end extremity of the damper bladder bleeder line 114c and the shaft portion of the volume adjustment mechanism 123. Also, sealers 127a are located in a circular fashion around the lower extremity of the block 126 so as to come into frictional and sealing contact with the plate 126a.

The bleed port 120 is located in the upper right hand portion of the block and is in communicating relationship with a generally conical and larger opening 120a. The conical opening 120a is in a cooperating position with the volume adjustment mechanism so that when the mechanism is threadably backed off, air from the bleed line 114c may flow relatively unrestricted through the bleed port 120. However, by advancing the volume adjust mechanism 123, the orifice 120a can be made decreasingly smaller thereby controlling the volume of air that will pass through bleed port 120 and controllably affecting the inflation (or deflation) of the associated bladder 113.

As suggested above, the aspirating thermostat 110 also contains a thermally responsive helically wound bimetallic strip with an outer end valve arm attachment 118 located over the upper end portion of the bleed port 120. The bimetal spring 130 is rigidly affixed to a generally rectangular geared bracket member 131 with the bracket 131 being pivotally attached to the thermostat casing by the boss 132. The thermostat adjustment lever 133 is likewise pivotally attached to the thermostat casing at its upper end portion by the shoulder bolt 134. The spur gear 135 is fixedly attached with respect to the upper end of the temperature adjustment lever and will move therewith. Spur gear 135 engages the teeth 136 in the upper end of the bracket member 131. In this manner, concomitant gear reduction effects the precision adjustment of the thermostatic setting in response to the movement of arm 133.

As further suggested above, the bimetallic valve arm 118 is fastened by screw 137 to the bimetal helical spring 130. This valve arm functions to variably restrict the bleed port orifice 120 in response to the expansion or contraction of the helical bimetal and will facilitate the thermostatic control of the system by ultimately varying the inflation of the bladder 113 in the manner described above. Finally, the generally arcuate slot 138 freely accommodates the presence of boss 132 and is located in the wide portion of the temperature adjustment lever, thereby permitting pivotal movement of lever arm 133 on shoulder bolt 134 with respect to the gear mounting boss 132. The reduction gearing enables the arm 133 to be moved in a relatively large arc while at the same time effecting the positioning of the bimetal valve arm 118 with respect to bleed port 120 in small inch fractional increments.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An aspirating thermostat for use with an air duct ventilation system, said system having a mechanism for varying the volume of air flow through the duct outlet into the room being temperature conditioned, the improvement comprising:

means defining a passage for exhausting air from said mechanism and terminating in a thermostatically controlled bleed port, a casing for said thermostat having an inlet and an outlet for accommodating flow of ambient air therethrough, said casing being connected with said passage defining means wherein said bleed port opens inside of said casing, a thermally responsive valve means mounted inside said casing intermediate said inlet and said outlet thereof and movable toward and away from said bleed port to vary the exhaust of air from said mechanism to thereby control pressure therein, said valve means being movable in response to a change in temperature in the ambient air, means located within said casing for inducing by aspiration a flow of ambient air through said inlet across said thermally responsive valve means and out said outlet whereby said valve means is positioned and volume of air flow through said duct is varied in relation to the temperature of the ambient air, said inlet and said outlet for said casing being in communicating relationship with the room being temperature conditioned by said system thereby creating a continuous flow of room air over said thermally responsive valve means to accurately sense the room air temperature and to vary said air flow volume accordingly and a restrictor member operatively associated with said bleed port and adjustable to control the flow therethrough, said restrictor member being accessible for adjustment exteriorly of said casing to limit the maximum flow rate through said bleed port and thereby limit the maximum quantity of conditioned air discharged into said room.

2. The combination as in claim 1 wherein said casing includes a partition separating said inlet from said outlet and a wall spaced from said partition and cooperating therewith to define a narrow ejector passage within said casing, said ejector passage being operable to create a region of reduced pressure to facilitate in the aspiration of room air over said thermally responsive valve means, said ejector passage being in communicating relationship with both said inlet and said outlet.

3. The combination as in claim 1 including a temperature adjustment lever, means for mounting at least a portion of said temperature adjustment lever interiorly of said casing, and means including reduction gearing for interconnecting said thermally responsive valve means to said temperature adjustment lever, said interconnecting means operable to permit a room temperature setting by varying the position of said thermally responsive valve means with respect to said bleed port.

4. An aspirating thermostat for use with an air duct ventilation system, said system having a damper plate in the air duct and movable to variably restrict the air flow through said air duct, a pneumatically operated actuator means operably coupled to said damper plate to move and to vary the volume of said air flow through said duct in proportion to pressure in said actuator means, means defining a passage for exhausting air from said actuator means and terminating in a thermostatically controlled bleed port, a casing for said thermostat having an inlet and an outlet for accommodating flow of ambinet air therethrough, said casing being connected with said passage defining means wherein said bleed port opens inside of said casing, a thermally responsive valve means mounted inside said casing intermediate said inlet and outlet thereof and movable toward and away from said bleed port to vary the exhaust of air from said actuator means to thereby control pressure therein, said valve means being movable in response to a change in temperature in the ambient air, means located within said casing for inducing by aspiration a flow of ambient air through said inlet across said thermally responsive valve means and out said outlet whereby said valve means is positioned and the volume of air flow through said duct is varied in relationship to the temperature of the ambient air, and an aspirating T including a conduit extending from said duct to connection with said passage defining means whereby pressure air flow from said duct operates said actuator, said passage defining means including a section extending downstream of said aspirating T and terminating in said bleed port whereby air flow through said conduit across the aspirating T to said bleed port induces the exhaust air out of said actuator means to said exhaust port and insures that said pneumatically operated actuator means is in proper condition with respect to said damper plate and the desired temperature, said conduit being of substantially smaller size than said passage deforming means at its connection therewith to thereby facilitate the inducement of air from said actuating means.

\* \* \* \* \*